United States Patent [19]
Tinker

[11] 3,877,231

[45] Apr. 15, 1975

[54] STEAM ENGINE SYSTEM AND PROCESS OF OPERATING THE SAME

[76] Inventor: Walter H. Tinker, P.O. Box C-97, Frankfort, Ohio

[22] Filed: July 5, 1974

[21] Appl. No.: 486,160

[52] U.S. Cl. .................. 60/654; 60/688; 60/691
[51] Int. Cl. ............................................. F01k 9/00
[58] Field of Search ............ 60/651, 654, 645, 670, 60/688, 690, 691

[56] References Cited
UNITED STATES PATENTS

| | | | |
|---|---|---|---|
| 695,510 | 3/1902 | Virtue | 60/688 |
| 2,949,013 | 8/1960 | Doble | 60/690 X |

Primary Examiner—Martin P. Schwadron
Assistant Examiner—Allen M. Ostrager

[57] ABSTRACT

A steam engine system having a condensate-feeding apparatus connected to the piston for depositing condensate from the condenser outlet into a heat-exchanging apparatus when the piston is substantially at the end of its drive stroke, the heat-exchanging apparatus being in communication with the cylinder through a port for mixing the condensate with residual steam to heat the condensate during the compression stroke of the piston, and having a condensate-discharging apparatus downstream of the heat-exchanging apparatus for discharging the heated condensate to a boiler inlet during the compression stroke of the piston. The condensate-feeding apparatus includes a plunger operated by the piston and movable into the condenser outlet during the compression stroke and into the cylinder during the drive stroke, the plunger having a pocket receiving condensate from the condenser outlet and dispensing the condensate into the port, and thence into the heat-exchanging apparatus. The heat-exchanging apparatus includes a screen extending across a chambaer in communication with the cylinder through the port, and acting to break the condensate into fine drops and to mix the drops with the residual steam. The condensate-discharging apparatus includes a funnel extending across the chamber downstream of the screen, the funnel collecting the heated condensate and delivering it to a boiler feed pump. A valve member is engageable with a valve seat defining a valve port in the funnel to close the valve port, and is disengageable from the valve seat at a predetermined pressure in the chamber upstream of the funnel so as to deliver the heated condensate to the boiler feed pump.

A process of operating a steam engine including the steps of mixing condensate with residual steam during the compression stroke of the piston to heat the condensate, and discharging the heated condensate to the boiler when the steam admission port is closed during the compression stroke. The heated condensate, when discharged, is at a pressure higher than that of the original condensate and at a temperature nearer that of the boiler liquid. The process further includes the steps of breaking the condensate into fine drops and mixing the drops with the residual steam to achieve intimate mixing for efficient heat exchange from the steam to the condensate, and collecting the heated condensate drops and discharging the collected heated condensate to the boiler feed line.

16 Claims, 15 Drawing Figures

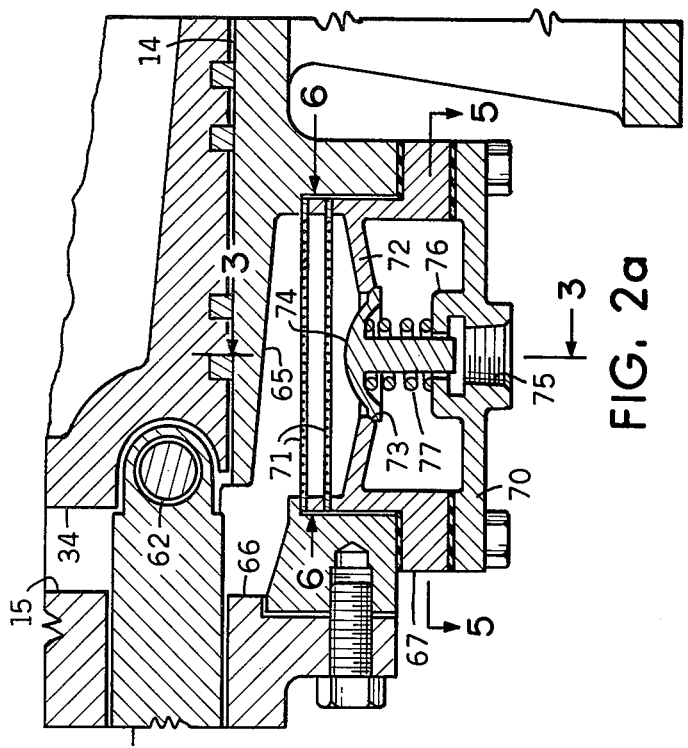
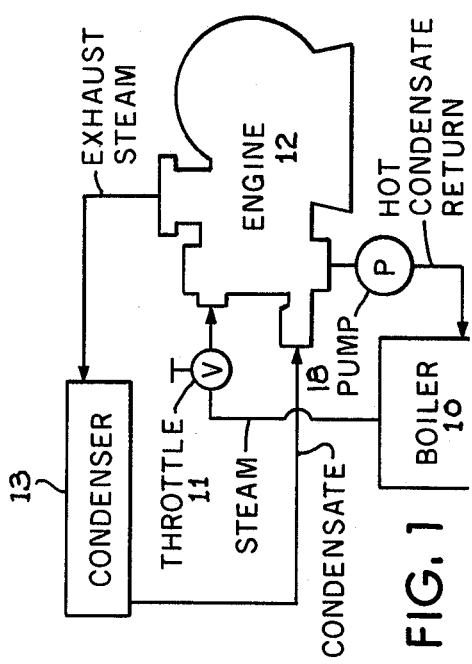
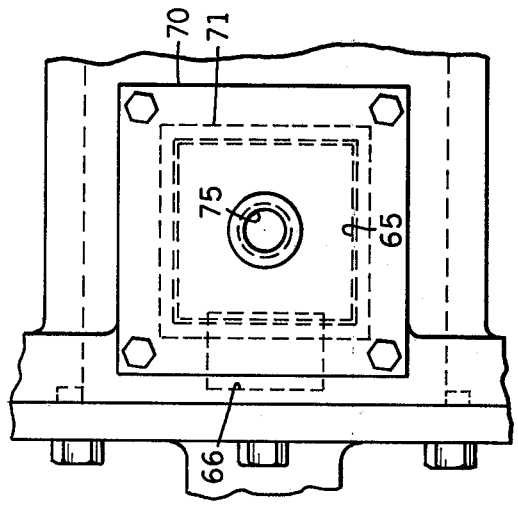
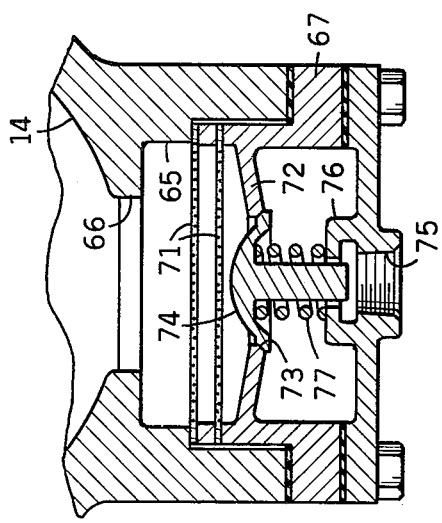
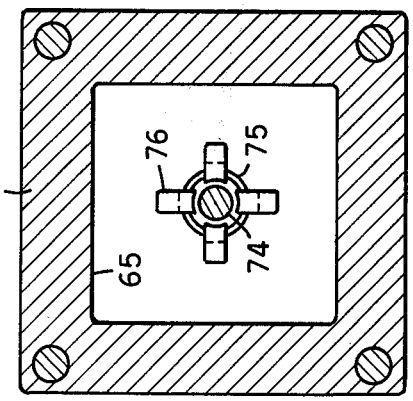

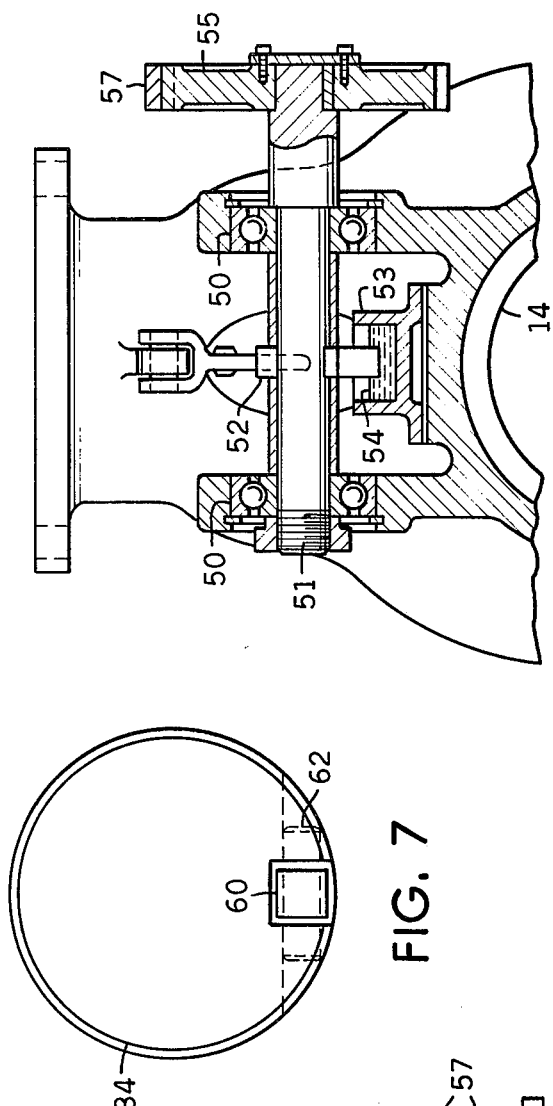
FIG. 8
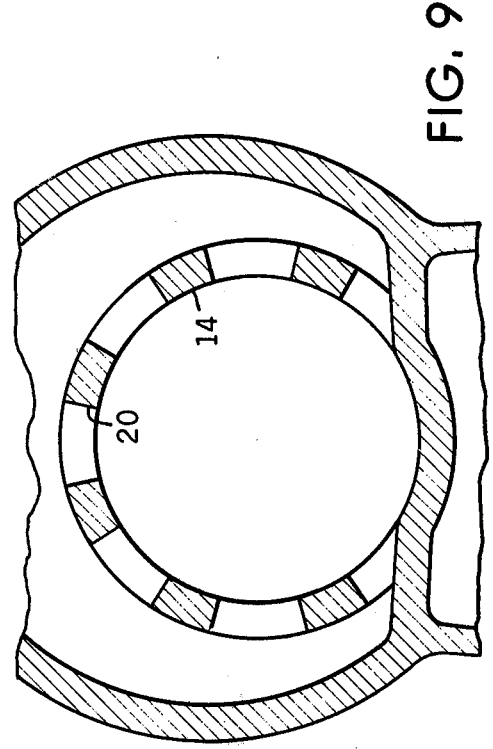
FIG. 9
FIG. 7
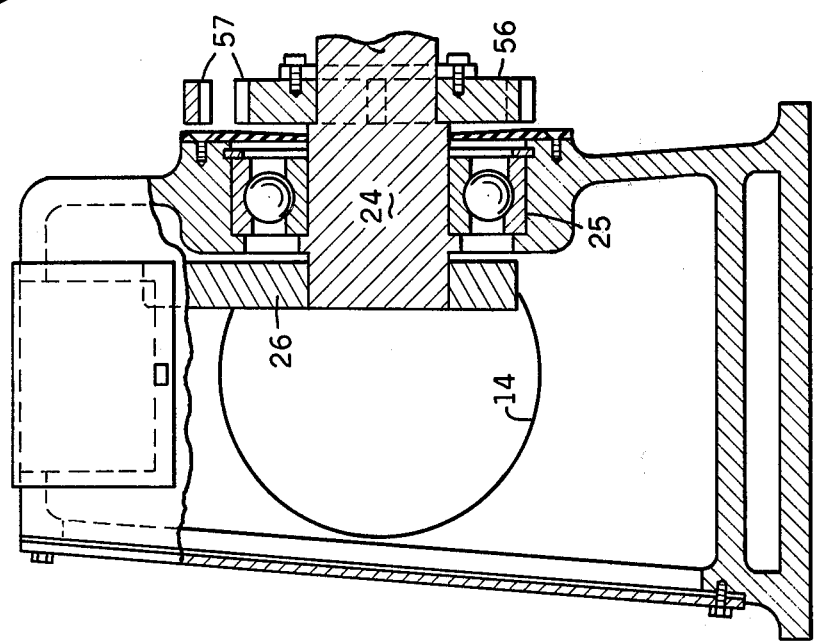
FIG. 10

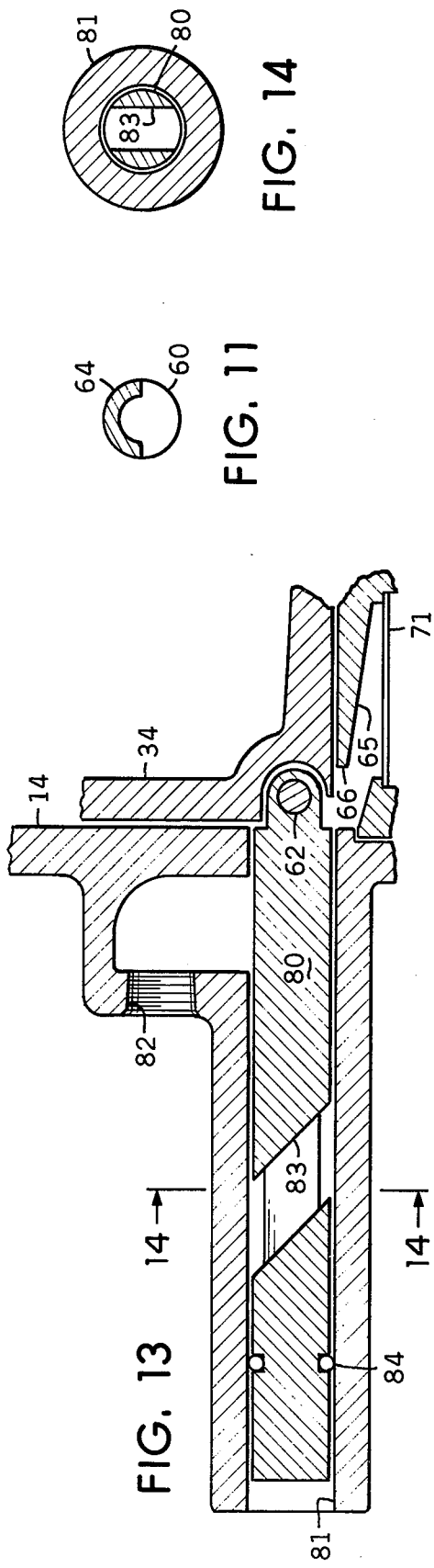
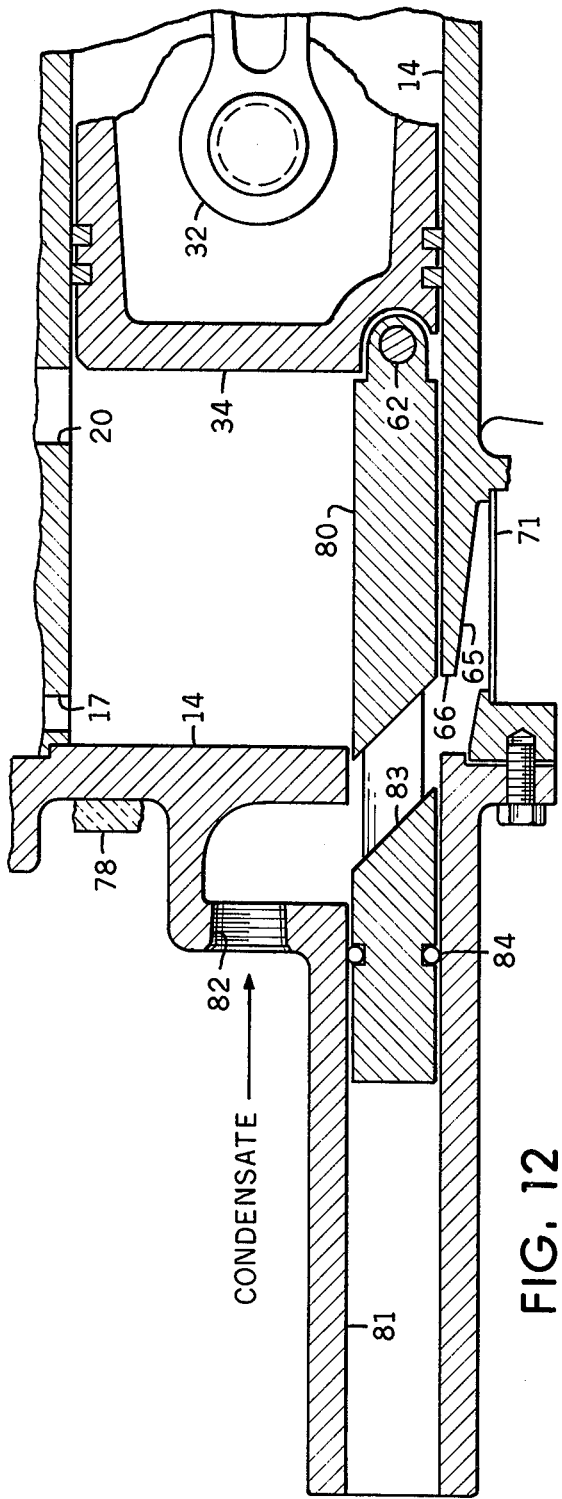

STEAM ENGINE SYSTEM AND PROCESS OF OPERATING THE SAME

BACKGROUND OF THE INVENTION

This invention relates to an improved closed-cycle steam engine system and to the process of operating such steam engine.

SUMMARY OF THE INVENTION

The present improved steam engine system and the process of operating such a steam engine has an increase in thermal efficiency over the heretofore conventional types of Rankine cycle engine. This increase in thermal efficiency is achieved by heating the condensate from the condenser by a regenerative process during the compression stroke of the piston and delivering the heated condensate to the boiler by a boiler feed pump.

The improved steam engine includes an engine having a cylinder, and a piston mounted in the cylinder, the cylinder having an exhaust port and a steam admission port opened and closed during the drive and compression strokes of the piston. In this closed-cycle system a condenser has an inlet communicating with the exhaust port, and a boiler has an outlet communicating with the steam admission port. A condensate-feeding means is connected to the piston for depositing condensate from a condenser outlet into a heat-exchanging means when the piston is substantially at the end of its drive stroke. The heat-exchanging means is in communication with the cylinder for mixing the condensate with residual steam to heat the condensate during the compression stroke. A condensate-discharging means, downstream of the heat-exchanging means, discharges the heated condensate to a boiler inlet during the compression stroke through the action of the boiler feed pump.

The condensate-feeding means includes a plunger operated by the piston and movable into the condenser outlet during the compression stroke of the piston, and into the cylinder during the drive stroke of the piston, the plunger having a pocket receiving condensate from the condenser outlet and dispensing the condensate into the heat-exchanging means near the end of the drive stroke, where a pocket opening is aligned with an inlet port of the heat-exchanging means. Preferably, the plunger is pivotally mounted to and movable with the piston.

The engine includes a guide means slidably receiving the plunger in sealing relation, the guide means closing and holding the condensate in the condensate-receiving, dispensing plunger pocket as the pocket moves from the condenser outlet to the piston cylinder.

The heat-exchanging means includes means for breaking the condensate into fine drops and mixing the drops with the residual steam. More particularly, the means for breaking the condensate into drops has a plurality of openings, and is located in a chamber in communication with the piston cylinder. Specifically, the means for breaking the condensate into drops is a screen extending across the chamber and located between the cylinder and the condensate-discharging means.

The condensate-discharging means includes a funnel located in and extending across the chamber downstream of the heat-exchanging means, the funnel collecting the heated condensate and delivering it to the boiler inlet. The condensate-discharging means further includes a valve member engageable with a valve seat that defines a valve port in the funnel to close the valve port, and disengageable from the valve seat at a predetermined pressure upstream of the funnel to deliver the heated condensate to the boiler.

The improved method of operating a steam engine includes the steps of depositing condensate from the condenser into the heat-exchanging means near the end of the drive stroke, and mixing the condensate with residual steam during the compression stroke of the piston to heat the condensate. This heated condensate is then discharged to the boiler.

The improved process includes the step of breaking the condensate into drops and mixing the drops with the residual steam to achieve intimate mixing for heat exchange from the steam to the condensate, and collecting the heated condensate drops and discharging the collected heated condensate to the boiler. More particularly, intimate mixing of the condensate and residual steam is achieved by passing the condensate and residual steam through means having a plurality of openings.

The efficiency gained by the process of operating the steam engine resides in the step of putting the condensate through screens, drawing the heat from the compressing steam and transferring it to the condensate, and then delivering the hot condensate back to the boiler.

BRIEF DESCRIPTION OF THE DRAWINGS

FIG. 1 is a diagram of the closed-cycle steam engine system;

FIG. 2a is an enlarged cross-sectional view of the condensate-feeding means, heat-exchanging means and condensate-discharging means taken along the longitudinal axis of the steam engine;

FIG. 3 is a sectional view as taken on line 3—3 of FIG. 2a;

FIG. 4 is a bottom plan view of FIG. 2a;

FIG. 5 is a cross-sectional view as taken on line 5—5 of FIG. 2a;

FIG. 6 is a view as taken on line 6—6 of FIG. 2a;

FIG. 7 is a view as taken on line 7—7 of FIG. 2;

FIG. 8 is a fragmentary cross-sectional view as taken on line 8—8 of FIG. 2;

FIG. 9 is a cross-sectional view as taken on line 9—9 of FIG. 2, with the piston removed for clarity;

FIG. 10 is a cross-sectional view as taken on the main drive shaft, with the crank arm and piston removed for clarity;

FIG. 11 is a cross-sectional view of the plunger of FIG. 2;

FIG. 12 is a fragmentary, cross-sectional view of a modified piston plunger construction with the piston at the limit of the drive stroke;

FIG. 13 is a fragmentary, cross-sectional view similar to FIG. 12 but showing the piston at the limit of the compression stroke; and FIG. 14 is a cross-section of the modified plunger construction as taken on line 14—14 of FIG. 13.

DESCRIPTION OF THE PREFERRED EMBODIMENT

Figure 2:
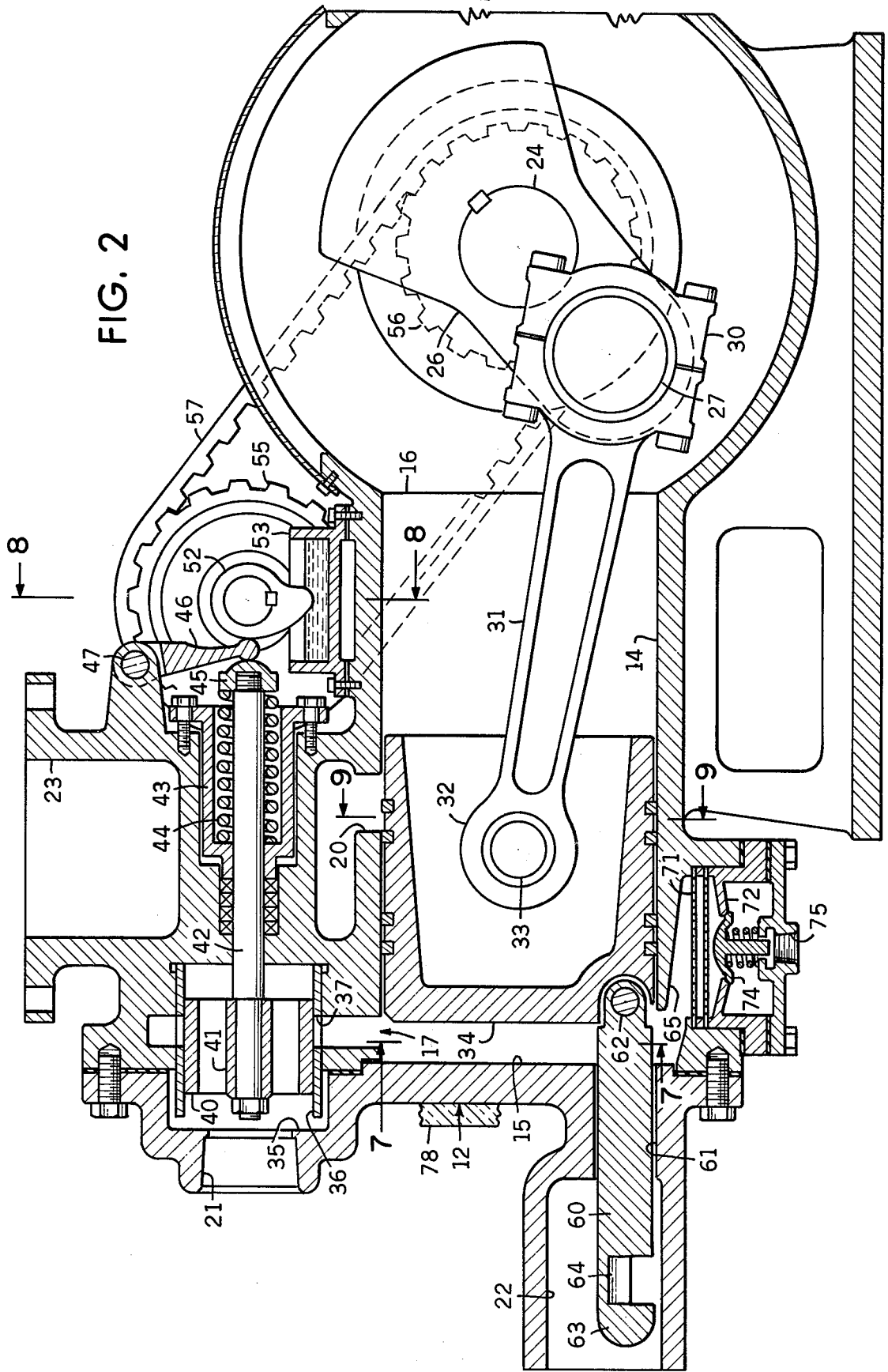
FIG. 2 is a cross-section longitudinally of the steam engine.

The closed-cycle steam engine system is shown diagrammatically in FIG. 1. It will be understood that the steam from a boiler 10 is fed through a throttle valve 11 into an engine 12. The exhaust steam is discharged to a condenser 13. Condensate from the condenser 13 is fed into the engine 12, and hot condensate is discharged from the engine 12 back into the boiler 10 by a boiler feed pump 18.

The engine 12 includes a piston cylinder 14 having a closed end 15 and an open end 16. Formed in the engine 12 and communicating with the piston cylinder 14 adjacent the closed cylinder end 15, is a steam admission port 17. Also formed in the engine 12 and communicating with the piston cylinder 14 between the steam admission port 17 and the cylinder open end 16, is an exhaust port 20.

The engine 10 includes a boiler outlet 21 that communicates with the cylinder 14 through the steam admission port 17 in a manner to be described later. A condenser outlet 22 is located on and carried by the closed end 15 of the piston cylinder 14. A condenser inlet 23 is formed in the engine and communicates with the piston cylinder 14 through the exhaust port 20.

The drive mechanism includes a main drive shaft 24 mounted in a bearing 25 carried by the engine 12, and another suitable outboard bearing (not shown). Keyed to and rotatable with the drive shaft 24 is a crank arm 26. As is usual, the crank arm 26 carries a pivot bearing 27 on which one end 30 of a connecting arm 31 is rotatively mounted. The other end 32 is pivotally mounted on a transverse bearing rod 33 that is fixed to a piston 34 reciprocatively and slidably mounted in the piston cylinder 14.

A chamber 35 is formed in the engine 12 and is located between the boiler outlet 21 and the steam admission port 17. Fixed in the chamber 35 is a bearing sleeve 36, the sleeve 36 being provided with a plurality of apertures 37 that are aligned and communicate with the steam admission port 17.

Slidably mounted in the bearing sleeve 36 is a steam admission valve 40, the valve 40 being provided with a plurality of longitudinal holes 41 to permit the passage of steam when the steam admission port 17 is open. The steam admission valve 40 is fixed to a rod 42 that is slidably mounted in the engine block. Fixed to the engine 12 is a cylindrical gland 43 that slidably receives the rod 42. A compression spring 44, located in the gland 43 and surrounding the rod 42, has one end that engages the gland 43 and another end that engages a nut 45 fixed to the end of rod 42. The spring 44 tends to urge the rod 42 and the steam admission valve 40 in a direction so that the valve 40 closes the steam admission port 17.

The valve-timing mechanism includes a bearing arm 46 pivotally mounted by pivot pin 47 to the engine 12, the bearing arm 46 having a ball end that engages a concave surface formed on the rod nut 45. Rotatively mounted by bearings 50 in the engine 12 is a transverse timing shaft 51. Fixed to and rotatable with the timing shaft 51 is a cam 52, the cam 52 being engageable with the ball end of the bearing arm 46. A cup 53 is fixed to the engine and is located below the cam 52, the cup 53 containing an oil bath 54 into which the cam 52 dips for lubrication.

A toothed timing wheel 55 is fixed to and rotatable with the timing shaft 51. An identical wheel 56 is fixed to and is rotatable with the main drive shaft 24. Extending between and positively interconnecting by meshing with the teeth of the timing wheels 55 and 56, is a continuous belt 57.

A condensate-feeding means includes an elongate plunger 60 slidably received in sealing relation in an elongate guide means or bearing 61 provided between the condenser outlet 22 and the piston cylinder 14. One end of the plunger 60 is pivotally connected by a transverse pin 62 to the front side of piston 34, while the opposite rounded nose end 63 is movable into the condenser outlet 22. The plunger 60 is provided with a condensate-receiving, dispensing pocket 64 which is located in and receives condensate from the condenser outlet 22 during the compression stroke of the piston 34. The guide means 61 closes and holds the condensate in the condensate-receiving, dispensing plunger pocket 64 as the pocket moves from the condenser outlet 22 into the piston cylinder 14.

A heat-exchanging means includes a chamber 65 formed in the engine and communicating through inlet port 66 with the bottom of the piston cylinder 14 at the closed cylinder end 15. The plunger 60 is located at the bottom of the piston cylinder 14 so that the condensate delivered by the plunger pocket 64 is dispensed directly into the chamber 65 through the port 66, the condensate-receiving, dispensing pocket having an opening that is aligned with the inlet port 66 near the end of the drive stroke. A hollow fitting 67 is disposed in the chamber 65, the fitting 67 being closed by a plate 70. A pair of spaced screens 71 extend across the chamber 65 and are retained by the fitting 67. These screens 71 have a plurality of openings that serve to break the condensate into fine drops and mix the drops intimately with residual steam in the cylinder 14 to heat the condensate during the compression stroke of the piston 34.

A condensate-discharging means includes a funnel 72 formed integrally with the fitting 67, the funnel 72 being located in and extending across the chamber 65 downstream of the screens 71. The funnel 72 includes a valve port defined by a valve seat 73 adapted to engage and seat a dome-shaped valve member 74 to close the valve port.

The fitting plate 70 is provided with a boiler feed pump inlet 75 communicating with the chamber 65. Disposed about the boiler inlet 75 are a plurality of spider arms 76 that serve to position the stem of the check valve member 74. A compression spring 77 is located about the valve stem, the spring 77 having one end engageable with the tops of the spider arms 76 and the opposite end engageable with the head of the valve member 74. The spring 77 tends to urge the valve member 74 against the valve seat 73. When the pressure in the chamber 65 upstream of the funnel 72 exceeds the pressure downstream plus the force of the spring 77, the valve member 74 will disengage from the valve seat 73 to deliver heated condensate to the inlet to the boiler feed line.

A modified construction of the condensate-feeding means is illustrated in FIGS. 12–14. In this modification, an elongate plunger 80 is slidably received in sealing relation in an elongate guide means or bearing 81 communicating with the piston cylinder 14. The condenser outlet 82 communicates with the side of the guide means 81. One end of the plunger 80 is pivotally connected by the transverse pin 62 to the front side of the piston 34. The plunger 80 is provided with an O-ring 84 that engages the interior wall of the guide means 81 to provide a seal since such guide means 81 is open to the atmosphere.

FIG. 12 shows the piston 34 and attached plunger 80 at the end of the drive stroke, with the steam exhausting out of ports 20 and with the condensate in the condensate-receiving, dispensing plunger pocket 80 being directly introduced and dispensed by the pocket into port 66. Just before the end of this drive stroke, the direction of throw of the dispensed condensate from the pocket 83 will be the vector sum of the plunger linear velocity at any instant and the velocity from static pressure in the pocket 83. However, at the end of the drive stroke (dead center) there is no plunger acceleration and the pressure causing flow out of pocket 83 will be the difference between the condensate return pressure and the pressure existing in inlet port 66 in addition to the weight (gravity fall) of the liquid in the pocket 83. With this construction of the plunger 80 and the condensate-receiving, dispensing pocket 83, the condensate is thrown directly into the port 66 and is not splashed or thrown into the piston cylinder 14.

On the return or compression stroke, the condensate-receiving, dispensing pocket 83 closes off communication with the inlet port 66 and picks up some condensate from the condenser outlet 82. Of course, the pocket 83 will again fill up with condensate from the condenser outlet 82 on the drive stroke of the piston 34 as described previously.

In order to describe the operation of the closed-cycle steam engine system, it will be assumed that the piston 34 is at the far end of the drive stroke and that the main exhaust port 20 is fully opened to place the piston cylinder 14 into communication with the condenser inlet 23, and thence to the condenser 13. During the expansion of the steam in the piston cylinder 14 incident to the drive stroke of the piston 34, the pressure in the cylinder 14 has dropped. However, this cylinder pressure decreases when the exhaust port 20 has been opened.

Simultaneously with the opening of the main exhaust port 20, during the drive stroke of the piston 34, the plunger 60 will move inwardly of the piston cylinder 14. The condensate that has been received and held in the condensate-receiving, dispensing plunger pocket 64 from the condenser outlet 22, is then dispensed directly into the inlet port 66 as the plunger pocket 64 clears the guide means 61 and moves into the piston cylinder 14. This condensate is urged by the plunger action through the inlet port 66 with substantially no splash into the piston cylinder 14, and then falls into the chamber 65 and onto the screens 71 of the heat-exchanging means. When the piston 34 stops at the end of the drive stroke, the condensate is thrown outwardly and downwardly of the condensate-receiving, dispensing plunger pocket 64 into the chamber 65.

As the piston 34 moves toward the closed cylinder end 15 during the compression stroke, the piston 34 will first close the main exhaust port 20 and will start to compress the residual steam in the cylinder 14. Because of the interface contact between the condensate filtering through the screens 71 in a multiplicity of fine drops with the residual steam, the intensity of the residual steam compression is continually held down, so to speak, thereby reducing the work of compression. This intimate mixing of the condensate drops with the residual steam takes heat from such steam and transmits it to the condensate. As the compression of the residual steam continues, the condensate is brought up to an increasing temperature. The heated condensate after passage through the screens 71 is collected by the funnel 72. The boiler feed pump 18 draws the condensate from the funnel 72 from beneath the valve member 74 and delivers the condensate to the boiler 10, the boiler feed pump 18 operating in response to the boiler water level as is conventional.

The timing shaft 51 and the main drive shaft 24 turn at identical speeds (rpm) because the timing wheels 55 and 56 are of the same pitch diameter. The cam 52 is designed so as to move the steam admission valve 40 sufficiently so that such valve 40 starts to open the steam admission port 17 after piston 34 has closed such port 17. The steam admission port 17 is fully opened by the steam admission valve 40 by the time piston 34 has reached the end of its compression stroke and has started its drive stroke sufficiently to uncover the steam admission port 17. At some later time in the drive stroke (usually about 30 percent of the drive stroke), the cam 52 enables the steam admission valve 40 to move quickly under loading of spring 44 in a direction to close the steam admission port 17, i.e., to effect "cut-off".

The volume or space of the chamber 65 in which the screens 71 are located, is a part of the main cylinder clearance. Some of the usual clearance would be that caused by the steam admission port 17, and the space between the piston 34 and the closed cylinder end 15 at the end of the compression stroke. Obviously, the chamber 65 is constantly exposed, or in other words, is constantly in communication with the cylinder 14. Just prior to admission of steam to the cylinder 14 through the steam admission port 17, the cavities, including the chamber 65, have been brought up to a temperature and the hot condensate discharged past the check valve 74 so that condensation does not substantially occur during the initial steam admission period or drive stroke. Any hot condensate remaining in the chamber 65 would have passed through the screens 71, and any small amount laying around the top of the check valve 74 in the funnel 72 has a very small surface exposure during expansion compared to that when the condensate was passing through the screens 71. Some heat from the expanding steam on the drive stroke will pass to the residual condensate, but very little because of the small surface exposure.

The liquid condensed out of the vapor in the heat-exchanging means is urged by pressure and by gravity is falling into the funnel 72. For example, the increasing pressure during the compression stroke is acting on top of the liquid, and simultaneously the suction of the boiler feed pump 18 is drawing the liquid away. There exists a "wet" condition (original condensate and residual steam during compression mixing through the screen 71), and a more or less "dry" condition during the initial steam admission period or drive stroke.

Depositing the condensate into the chamber 65 and passing the condensate through the screens 71 so that the condensate is broken into a multiplicity of fine drops which are intimately mixed with the residual steam under compression, effects a transference of heat from the steam to the condensate. Then, collecting this heated condensate and delivering it back to the boiler 10 at a temperature higher than the original condensate realizes an efficiency gain.

Those skilled in the art know it is customary to lag 78 all cylinder surfaces to reduce heat loss which also applies to this engine, as shown by fragmentary example in FIGS. 2 and 3.

The operation of the system is essentially the same with the plunger assembly illustrated in FIGS. 12–14. The basic difference is that this plunger assembly provides even more assurance that the condensate will be dispensed into the inlet port 66 with no splash into the piston cylinder 14. Again, the liquid condensate is thrown directly onto the screens 71.

The process of operating the steam engine comprises the steps of exhausting expanded steam to the condenser 13 when the exhaust port 20 is open during the drive stroke of the piston 34, depositing condensate from the condenser 13 into a heat-exchanging means near the end of the drive stroke, mixing the condensate with residual steam during the compression stroke of the piston 34 to heat the condensate, discharging the heated condensate to the boiler 10, and delivering steam from the boiler 10 to the piston cylinder 14 when the steam admission port 17 is opened for the drive stroke of the piston 34.

In addition, the process includes the step of breaking the condensate into drops and mixing the drops with the residual steam to achieve intimate mixing for heat exchange from the steam to the condensate. Then, the heated condensate drops are collected and discharged to the boiler 10.

I claim as my invention:

1. The process of operating a steam engine, comprising the steps of:
   a. exhausting expanded steam through a condenser when an exhaust port is opened during the drive stroke of the piston,
   b. dispensing condensate from the condenser into a heat-exchanging means near the end of the drive stroke,
   c. mixing the condensate with residual steam during the compression stroke of the piston to heat the condensate,
   d. discharging the heated condensate to a boiler when the steam admission port is closed during the compression stroke of the piston, and
   e. delivering steam from the boiler to the piston cylinder when the steam admission port is opened for the drive stroke of the piston.

2. The process as defined in claim 1, in which:
   f. the heated condensate is discharged for the boiler at a pressure higher than that of the boiler.

3. The process as defined in claim 1, in which:
   f. the heated condensate is discharged for the boiler at a temperature substantially greater than that of the original condensate.

4. The process as defined in claim 1, including the step of:
   f. breaking the condensate into drops and mixing the drops with the residual steam to achieve intimate mixing for heat exchange from the steam to the condensate.

5. The process as defined in claim 4, including the step of:
   g. collecting the heated condensate drops and discharging the collected heated condensate for the boiler.

6. The process as defined in claim 1, including the step of:
   f. passing the condensate and residual steam through means having a plurality of openings to achieve intimate mixing for heat exchange from the steam to the condensate.

7. The process as defined in claim 1, including the steps of:
   f. dispensing the condensate into a chamber that is in communication with the cylinder,
   g. passing the condensate and residual steam through a perforated means in the chamber to achieve intimate mixing for heat exchange from the steam to the condensate, and
   h. discharging the heated condensate from the chamber to the boiler after passage through the perforated means.

8. In a steam engine system:
   a. an engine including:
      1. a cylinder,
      2. a piston mounted in the cylinder, and
      3. the cylinder having an exhaust port and a steam admission port opened and closed during the drive and return strokes of the piston,
   b. a condenser having an inlet communicating with the exhaust port, and having an outlet,
   c. a boiler having an outlet communicating with the steam admission port, and having an inlet,
   d. condensate-feeding means connected to the piston,
   e. heat-exchanging means in communication with the cylinder, the condensate-feeding means dispensing condensate from the condenser outlet into the heat-exchanging means when the piston is substantially at the end of its drive stroke, and the heat-exchanging means mixing the condensate with residual steam to heat the condensate during the compression stroke of the piston, and
   f. condensate-discharging means downstream of the heat-exchanging means for discharging the heated condensate for the boiler.

9. A steam engine system as defined in claim 8, in which:
   g. the condensate-feeding means includes a plunger operated by the piston and movable to the condenser outlet during the compression stroke of the piston, and into the cylinder during the drive stroke of the piston, the plunger having a condensate-receiving, dispensing pocket communicating with and receiving condensate from the condenser outlet during the compression stroke, and communicating with and dispensing the condensate into the heat-exchanging means near the end of the drive stroke.

10. A steam engine system as defined in claim 9, in which:
    h. the engine includes a guide means adjacent the condenser outlet and the piston cylinder, the guide means slidably receiving the plunger, and the guide means closing and holding the condensate in the condensate-receiving, dispensing plunger pocket as the pocket moves from the condenser outlet into the piston cylinder.

11. A steam engine system as defined in claim 10, in which:
    i. the plunger is pivotally mounted to and movable with the piston.

12. A steam engine system as defined in claim 8, in which:

g. the heat-exchanging means includes means for breaking the condensate into drops and mixing the drops with the residual steam.

13. A steam engine system as defined in claim 8, in which:
   g. the heat-exchanging means includes:
      1. a chamber in communication with the piston cylinder, and
      2. means, having a plurality of openings, in the chamber for breaking the condensate into drops and mixing the drops with the residual steam.

14. A steam engine as defined in claim 13, in which:
   h. the means having the plurality of openings is a screen extending across the chamber and located between the cylinder and the condensate-discharging means.

15. A steam engine as defined in claim 13, in which:
   h. the means having the plurality of openings is located between the cylinder and the condensate-discharging means, and
   i. the condensate-discharging means includes a funnel located in and extending across the chamber downstream of the means having the openings, the funnel collecting the heated condensate and delivering it for the boiler inlet.

16. A steam engine system as defined in claim 15, in which:
   j. the funnel includes a valve port defined by a valve seat, and
   k. the condensate-discharging means further includes a valve member engageable with the valve seat to close the valve port, and disengageable from the valve seat at a predetermined pressure in the chamber upstream of the funnel to deliver the heated condensate for the boiler.

* * * * *